United States Patent [19]
Healy et al.

[11] 3,940,573
[45] Feb. 24, 1976

[54] MANUALLY ACTUABLE REPERTORY DIALER

[75] Inventors: James W. Healy, Wakefield; Argyle G. Lautzenhiser, Magnolia, both of Mass.

[73] Assignee: DASA Corporation, Andover, Mass.

[22] Filed: July 5, 1974

[21] Appl. No.: 486,111

[52] U.S. Cl. ............................ 179/90 BB; 360/105
[51] Int. Cl.² ........................................ H04M 1/46
[58] Field of Search.......... 179/90 BB, 90 B, 90 BD; 360/82, 83, 101, 105, 107, 134, 104

[56] References Cited
UNITED STATES PATENTS

| | | | |
|---|---|---|---|
| 2,921,142 | 1/1960 | Tinus ............................ | 179/90 BB |
| 3,104,288 | 9/1963 | Kobler ........................... | 179/90 BB |
| 3,207,453 | 9/1965 | Kilburg .......................... | 179/90 BB |
| 3,301,958 | 1/1967 | Blakeslee et al. ............... | 179/90 BB |
| 3,364,314 | 1/1968 | Huizinga et al. ................ | 179/90 BB |
| 3,428,758 | 2/1969 | Hall et al. ...................... | 179/90 BB |

*Primary Examiner*—Kathleen H. Claffy
*Assistant Examiner*—Gerald L. Brigance
*Attorney, Agent, or Firm*—Weingarten, Maxham & Schurgin

[57] ABSTRACT

A telephone repertory dialer having a manually actuable mechanism mechanically operative for providing relative motion between a magnetic head and a magnetic recording surface. An elongated tape includes a magnetic recording surface and an opposite visual writing surface, the tape being carried by a transport mechanism manually movable to selected positions at which telephone number data is to be recorded or read out. Upon manual actuation of a control button the magnetic head is moved to a start position and then is caused to return at a controlled uniform rate to a home position during which return motion telephone number data is recorded or read out via the magnetic head in accordance with a selected recording or playback mode.

11 Claims, 6 Drawing Figures

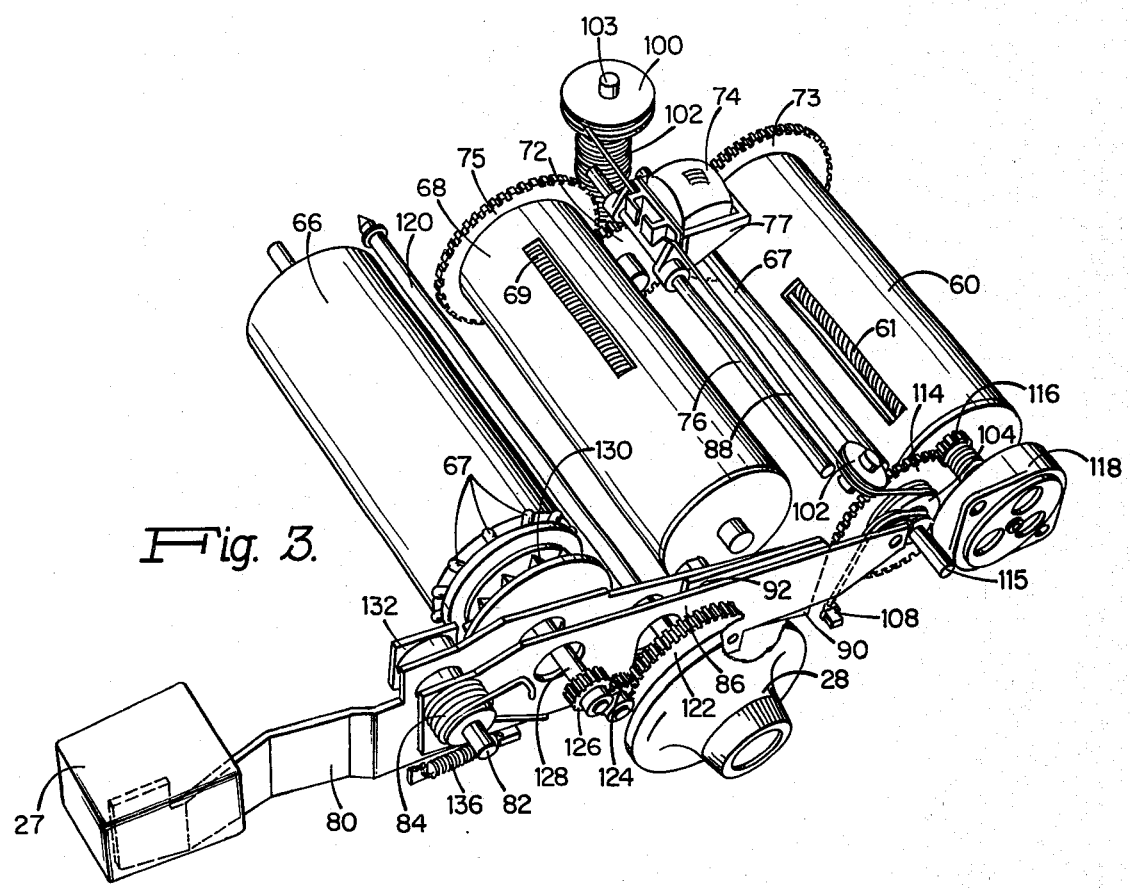
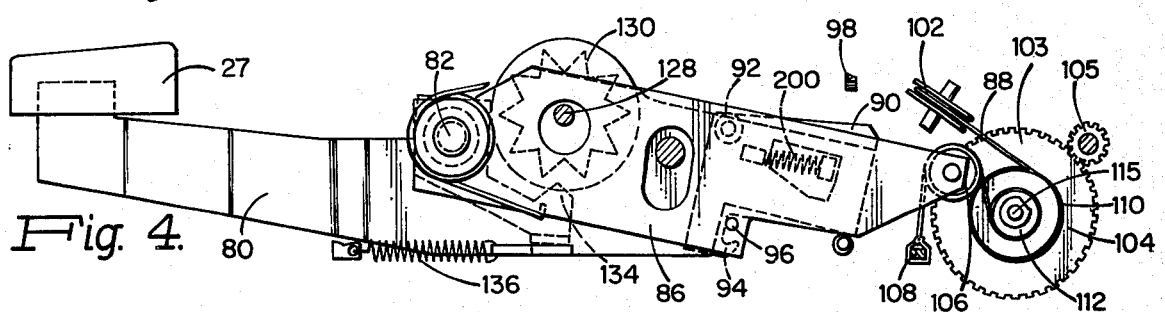
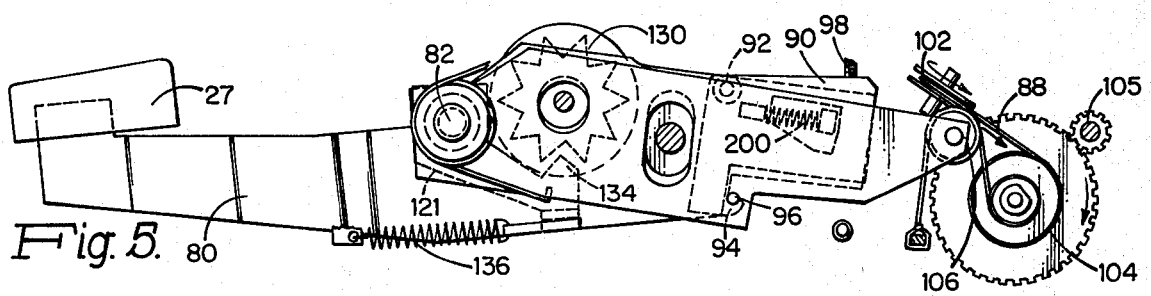
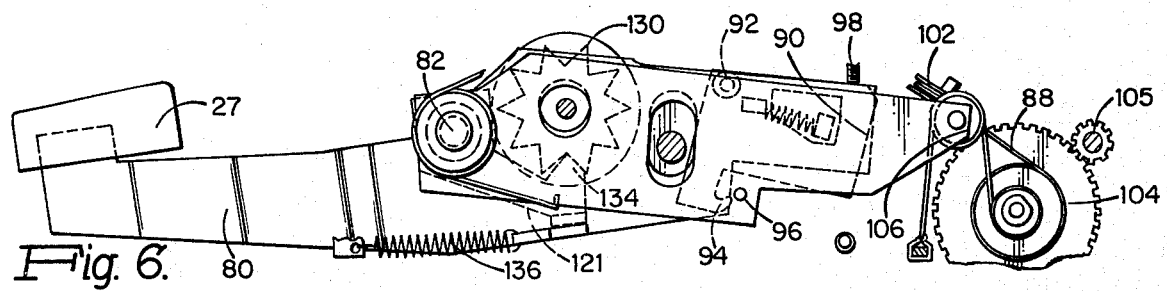

MANUALLY ACTUABLE REPERTORY DIALER

FIELD OF THE INVENTION

This invention relates to telephone repertory dialers and more particularly to a repertory dialer especially suited for home or office use and having a manually actuable mechanism mechanically operative for reading and recording telephone numbers on a magnetic storage surface.

BACKGROUND OF THE INVENTION

Telephone repertory dialers are known in which a plurality of telephone numbers are stored in a suitable data format in a storage medium for later readout of a selected number. A well-known repertory dialer sold under the trademark MAGICALL employs as elongated web contained in a cartridge and having a magnetic recording surface for recording a plurality of telephone numbers across the width thereof in respective tracks and an opposite visibly readable surface for entering the names or numbers recorded on the magnetic surface. A magnetic transducing head is disposed in operative association with the magnetizable surface, and a motor driven mechanism is provided for longitudinally moving the web to a selected number to be dialed and to cause transport of the transducer relative to the magnetizable surface to read out the number stored therein for transmission over the telephone line. Such a dialer operates in an accurate and highly reliable manner. However, the cost of the device is governed in large part by the mechanical drive assembly which includes an accurate motor drive for transport of the tape head relative to the magnetic surface in order to provide accurate pulse information compatible with the requirements of a telephone switching system. It would be advantageous and it is an object of this invention to provide a repertory dialer in which a relatively low cost and simple mechanical assembly is employed in the recording and readout of telephone number data from a magnetic storage surface.

SUMMARY OF THE INVENTION

In accordance with the invention, a telephone repertory dialer is provided which is manually actuated and mechanically operable to produce relative motion between a record/reproduction head and a magnetic recording surface for the recording and readout of telephone number data. The dialer includes electronic circuitry having a temporary memory for storage of a single number, which number may be transmitted over the telephone line or recorded on the magnetic surface or both. The telephone number data is generated electronically in a precise and repeatable manner and there is no direct dependence upon mechanical motion between the magnetic storage surface and transducing head for accurate telephone number generation or reproduction. Electrical power is required in minimal amount only for the electronic circuitry of the dialer, and such power can be provided for example by small batteries or from the telephone line.

In brief, the novel dialer includes a mechanical assembly which is manually actuable by depression of a control button to cause relative movement between a record/reproduction head and a magnetic recording surface for recording or reading out a telephone number, in accordance with a particular selected operative mode. In a recording mode, telephone number data, such as from a numerical keyboard, is entered into a temporary memory and upon a suitable command, such as from manual actuation of an operating button, is conveyed to the magnetic head for recording on the associated magnetic surface. The operating button also serves to initiate relative motion between the head and the recording surface. For playback operation, manual actuation of an operating button causes readout of the telephone number stored on the recording surface into the memory and thence in an accurately timed manner governed by the associated electronic circuitry out to the telephone line.

DESCRIPTION OF THE DRAWING

The objects, advantages and features of this invention will become readily apparent from the following detailed description when taken in conjunction with the accompanying drawing in which:

FIG. 3 is a cutaway pictorial view of the major structure of the dialer of FIG. 1; and FIGS. 4, 5 and 6 are elevation views of the dialer structure illustrating the operation thereof.

DETAILED DESCRIPTION OF THE INVENTION

Figure 1:
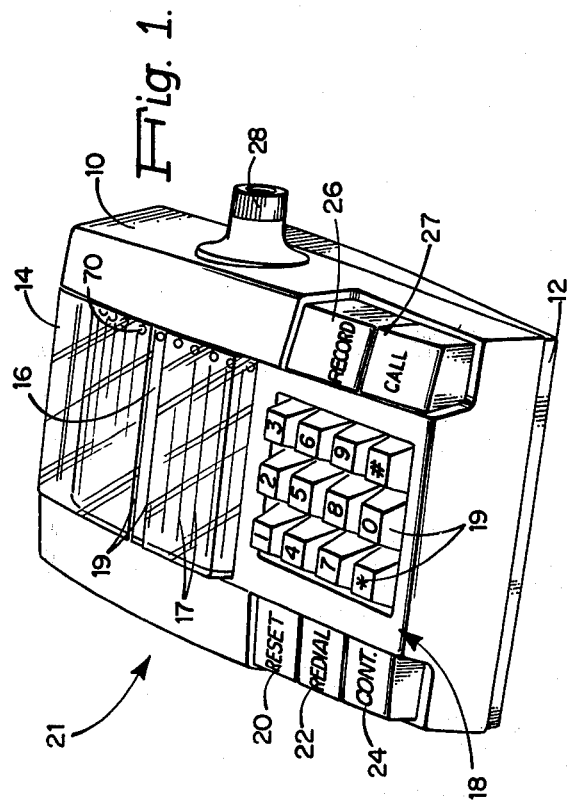
FIG. 1 is a pictorial view of an automatic repertory dialer constructed in accordance with the invention.

The invention is shown in its external aspect in FIG. 1. The novel telephone repertory dialer is contained within a housing 10 affixed to base plate 12 and which includes electronic circuitry for storing a representation of a telephone number, together with associated controls for accomplishing the recording and dialing of telephone numbers. The housing includes a transparent cover 14 beneath which is a portion of an elongated tape 16 which includes a writing surface visible in FIG. 1, having lines 17 thereacross defining areas for entering the names of called parties, the telephone numbers of which are recorded on an opposite surface of the tape. The opposite surface of tape 16, not visible in FIG. 1, is of magnetizable material for magnetically recording signals thereon representing telephone numbers and which are recorded by means of a known magnetic recording head. The cover 14 can be raised for access to the writing surface of tape 16 for entry of called party names thereon.

A keyboard 18 is provided on housing 10 having individual push buttons 19 for actuation of switches corresponding to the numerals 0 – 9 and special functions. The housing 10 also includes control buttons 20, 22, 24, 26 and 27 labelled respectively, reset, redial, continue, record and call for governing operation of the dialer for recording and reading out telephone numbers. A manually rotatable knob 28 extends from one side of housing 10, the knob being coupled to the transport mechanism on which tape 16 is wound, and by which the position of tape 16 is controlled to select a particular telephone number for dialing, or a particular area of the tape for recording of a number thereon.

Figure 2:
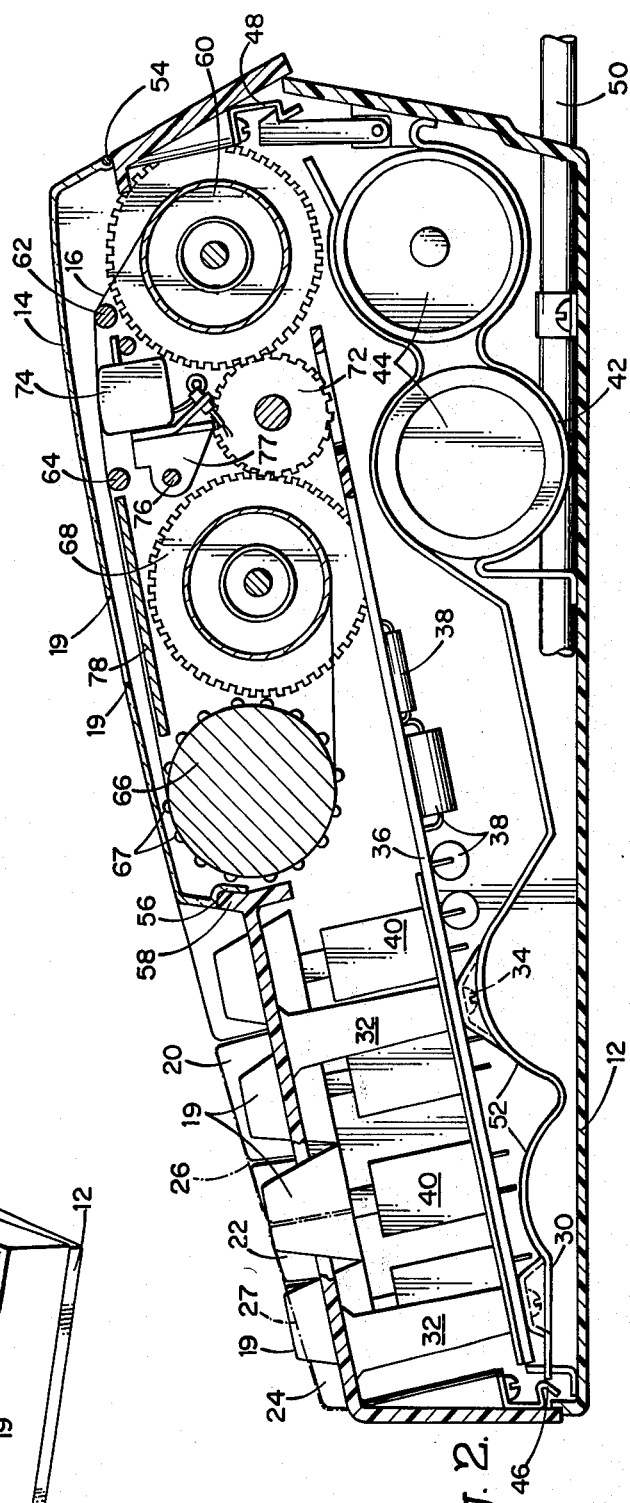
FIG. 2 is a sectional elevation view of the dialer of FIG. 1.

The dialer mechanism is shown in FIGS. 2–6. The general arrangement of the mechanism and associated electronic circuitry within housing 10 is depicted in FIG. 2, and includes a bracket 30 secured to housing 10 by appropriate means such as housing flanges 32 and fasteners 34. A printed circuit board 36 is attached to bracket 30 as shown, the circuit board containing circuit components 38 comprising the electronic circuitry associated with the dialer mechanism. The circuit board also has mounted thereon the switches associated with the operating control buttons, such as switch 40 illustrated in FIG. 2. A bracket 42 is affixed to base plate 12 and is configured cooperatively with the confronting portion of bracket 30 to retain a pair of batteries 44 therebetween. The base plate 12 is detachably affixed to housing 10 by means of front and rear latches 46 and 48 respectively. The latches may be of the spring type as illustrated, or of any other suitable type to retain the housing and base plate in engagement. The base plate also has secured therein a cable 50 for interconnecting the dialer to a telephone line.

The novel dialer in the mechanical configuration illustrated is adapted for either table-top or wall-mounted use. The dialer depicted in FIG. 2 is arranged for table-top use and provides a downwardly sloping top surface for ready visibility and ease of operator usage. Wall mounting is accomplished by rotating base plate 12 by 180° from the position shown in FIG. 2, such that rounded portions 52 of bracket 30 mate with bracket 42 to retain batteries 44, and in which disposition the front surface of housing 10 slopes downward and outward from a mounting wall for ease of visibility and use. It will be appreciated that the dialer can be contained within different housing configurations suitable to particular requirements and need not employ the mounting apparatus illustrated.

Cover 14 is pivotally attached to housing 10 by means of pin 54 at the rearward end thereof, and the cover is retained in a closed position by means of a lip portion 56 at the forward end thereof engaging a cooperative ridge 58 of the housing. The tape 16 is wound on a tape spool 60 and extends over guide rollers 62 and 64 around a sprocket wheel 66 and thence to a second tape spool 68. The tape includes an array of sprocket holes 70 along one edge thereof, as seen in FIG. 1, which cooperate with the sprocket teeth 67 of wheel 66 for driving the tape forward and backward along its travel path in response to rotation of knob 28. An idler wheel 72 is in meshing relationship with the geared flanges 73 and 75 of tape spools 60 and 68. A magnetic head 74 is disposed adjacent the magnetizable surface of tape 16 at a position between guide rollers 62 and 64, the head being affixed to a mounting assembly 77 linearly movable along a rod 76 for relative scanning of the recording surface. A plate 78 is disposed adjacent the recording surface of tape 16 in a position illustrated to serve as a platen against the tape is urged when writing called party names on the writing surface of the tape.

As best shown in FIG. 3, tape spools 60 and 68 include respective springs 61 and 69 therein for biasing the spools in opposite directions to maintain tension on tape 16 wound thereon. In the embodiment as illustrated in FIG. 3, spool 60 is biased in a clockwise direction while spool 68 is biased counterclockwise. The tape transport mechanism is manually controlled by means of knob 28 and upon forward or reverse rotation of knob 28, sprocket wheel 66 is driven correspondingly by means of meshed gears 122, 124 and 126. Tape 16 is driven by sprocket teeth 67 with spools 60 and 68 being rotatable according to accommodate the tape motion. The tape spools 60 and 68 are in meshing relationship by means of gears 73, 72 and 75 to rotate in synchonism in response to tape motion.

Referring now to FIGS. 3–6, a lever 80 has an end to which record/dial button 26 is affixed and by which the recording or dialing of telephone number information is accomplished. Arm 80 is pivotally movable on pin 82 and has a rearward portion which is biased downward by means of a spring 84 mounted around pin 82. An idler lever 86 is disposed generally parallel to arm 80 and has a forward end pivoted to pin 82 and a rearward end engaging flexible cord 88 by means of pulley 106 rotatably affixed at the rearward end thereof. Latch 90 is pivoted to lever arm 80 by means of a pin 92 and includes a hook 94 which engages a pin 96 affixed to arm 86. A bias spring 200 urges latch into engagement with pin 96. A stop member 98 is mounted to the mechanism support structure for engagement of the confronting end of latch 90 to cause disengagement of hook 94 from pin 96 when latch 90 reaches the uppermost point of travel.

Cord 88 to which magnetic head 74 is coupled extends across the dialer mechanism between pulleys 100 and 102. An end of cord 88 is affixed to pulley 100 which is coupled to a biasing means 102, such as a spring around the shaft 103 of pulley 100, operative to urge cord 88 and magnetic head 74 coupled thereto to its rest or home position, illustrated in FIG. 3. From pulley 102, cord 88 passes around pulleys 104 and 106 and is anchored to a pin 108 mounted to the support structure. Pulley 104 has grooves of different diameters about both of which cord 88 is wound. As best seen in FIGS. 4–6, cord 88 is disposed around larger portion 110 of pulley 104 and thence around smaller portion 112.

As seen in FIG. 3, gear wheel 114 is affixed to pulley 104 and is rotatable therewith on a common shaft 115. Gear 114 meshes with gear 116 which is supported by the shaft of tape spool 60 and to which shaft is coupled a governor 118. Knob 28 is connected to shaft 120 also carrying gear 122 disposed adjacent knob 28. Gear 122 is coupled by gear 124 to gear 126 mounted to shaft 128 to which is secured sprocket wheel 66 and star wheel 130. An arm 132 is pivotally affixed to pin 82 and has a pawl 134 engageable with the notches defined by the adjacent teeth of star wheel 130. Arm 132 is biased such as by an over-center spring (not shown). In one position, as depicted in FIG. 4, pawl 134 is disengaged from the star wheel when arm 80 is in its uppermost position. In a second position, illustrated in FIG. 5, pawl 134 is disposed between the teeth of star wheel 130 but not fully engaging the teeth, this position occurring at an intermediate downward position of arm 80. Upon additional downward movement of arm 80, the over-center spring causes pawl 134 to snap into engagement with star wheel 130, as shown in FIG. 6. In this latter position the star wheel and the sprocket wheel 66 coupled thereto, is positively positioned to remain in predetermined position such that upon full depression of arm 80 to cause dialer operation, the tape 16 remains in fixed position. A spring 136 urges arm 80 to its normal raised position.

Upon rotation of knob 28, the star wheel 130 is correspondingly moved causing pawl 134 to be urged outward by an amount sufficient to cause the over-center spring to urge the pawl out of engagement with the star wheel to permit free rotation of sprocket wheel 66 and tape 16 supported therearound.

For dialer operation, call button 27 is manually depressed to cause movement of magnetic head 74 to a position at the opposite edge of tape 16, after which the magnetic head is caused to return its home position at a controlled rate for recording telephone number data onto the recording surface of tape 16 or for reading out number data previously recorded thereon. Upon depression of arm 80 by operating button 27, the rearward portion of arm 80 moves upward also raising arm 86 and pulley 106 carried thereby. Upward movement of pulley 106 causes rotation of pulley 104 which in turn draws cord 88 and magnetic head 74 to a start position, which is the opposite position from that shown in FIG. 3. When the rearward portion of arm 80 and arm 86 reach the uppermost portion of their travel, latch 90 engages stop 98 causing disengagement of hook 94 from pin 96, as shown in FIG. 6. Such disengagement of pin 96 causes arm 86 and pulley 106 to drop downward releasing the restraining force on cord 88 and causing the cord to retract by action of biased pulley 100, and causing corresponding return of magnetic head 74 to the home position. By means of mechanical amplification provided by two-diameter pulley 104, a greater travel extent is provided for magnetic head 74 in response to a lesser travel extent of the rearward portion of arm 80. Return motion of magnetic head 74 is controlled by governor 118 coupled via gears 114 and 116 to pulley 104 to provide accurate and uniform return motion of the magnetic head for magnetic recording and readout purposes.

To employ the novel dialer for recording a telephone number on tape 16, the tape is manually conveyed by means of control knob 28 to a position at which a number is to be entered. The tape includes reference lines 17 across the visual writing surface to define transverse areas in which the name or other indication of the recorded number is written. The area at which an entry is to be made is visually aligned with the reference lines 19 provided across the width of cover 14. After alignment of the area in which a number is to be entered, cover 14 is raised and the identifying information written into the defined area. Platen 78 disposed beneath tape 16 in a position adjacent the recording surface serves as a backing member to permit the writing of data onto the visual tape surface.

To record a magnetic representation of a telephone number, the number is selected by means of keyboard 19 and entered by record button 26 into an electronic memory which is part of the circuitry associated with the dialer, but which is not the subject of this application. The call button 27 is depressed to cause movement of magnetic head 74 to a start position, as described above, and controlled transport of the magnetic head across the magnetic recording surface of tape 16 back to a home position. During such controlled movement of head 74 across the recording surface of tape 16, telephone number data derived from the number data in memory is provided to head 74 for the recording of the number data onto the recording surface. A telephone number is thereby stored along a predetermined transverse area of tape 16 for later use. Other telephone numbers are similarly recorded on respective transverse areas of tape 16, and corresponding visual identification of such telephone numbers similarly entered onto the corresponding transverse areas of the visual surface of tape 16.

It is contemplated that telephone number data can be recorded on tape 16 in areas across the tape width which are transverse or generally transverse to the longitudinal axis of the tape depending upon the specific path of motion of head 74 relative to tape 16. In the embodiment shown, head 74 is caused to move in a linear substantially transverse path across the tape. In alternative implementation, the head can be caused to move in a skewed or arcuate path across the tape width as determined by the particular mechanism employed.

To dial a number recorded on tape 16, the number to be dialed is selected by rotation of knob 28 to a position aligning the visual indication of the intended number within the reference lines 19 on cover 14, at which position the corresponding recorded data on the recording surface of tape 16 is generally aligned with the magnetic head 74. Precise alignment between the magnetic head and the recorded area is achieved by operation of the star wheel mechanism described above. Upon depression of call button 27, magnetic head 74 is again caused to move to a start position and then to return to its home position at a controlled rate during which return movement the recorded telephone number data is sensed by the head 74 to provide electrical signals representative of the recorded data which signals are conveyed to the electronic memory of the associated circuitry for temporary storage of the sensed telephone number data. The telephone number data stored in electronic memory is then read out and applied to a telephone line for transmission to complete the call.

The control buttons 20, 22 and 24 respectively labelled reset, redial and continue are employed in conjunction with the electronic circuitry associated with the novel dialer but form no part of this invention. These control buttons are useful in providing operator control of desired functions during dialer use.

It will be appreciated that various modifications and alternative implementations will occur to those versed in the art without departing from the true scope of the invention. Accordingly, it is not intended to limit the invention by what has been particularly shown and described except as indicated in the appended claims.

What is claimed is:
1. A telephone dialer comprising:
   a magnetic recording medium;
   means for recording representations of telephone numbers on respective portions of said recording medium including a magnetic record/reproduction head disposed in operative association with said magnetic recording medium;
   means for selectively providing a recording and readout mode;
   manually actuable mechanically operative means for causing during a first travel portion of a control button relative movement of said magnetic head and said medium to a start position and during a second travel portion of said control button controlled relative movement between said head and said medium from said start to a home position to selectively record or readout said representations of a telephone number.
2. A telephone dialer according to claim 1 wherein said magnetic recording medium includes:
   an elongated web having a magnetic recording surface on one side thereof;
   and further including;
      a manually operable transport mechanism coupled to said elongated web and including a manually operable control knob for causing movement of said web along the length thereof in either a forward or rearward direction to position said web at selected portions for recording or reproducing said representations of telephone numbers.

3. A telephone dialer according to claim 1 wherein said manually actuable mechanically operative means includes a control arm coupled to said control button and movable upon actuation of said control button through a predetermined extent including said first travel portion and said second travel portion contiguous with said first travel portion such that movement of said head relative to said recording medium to said start position and thence from said start position to said home position occurs in a sequential manner during continuous movement of said control arm.

4. A telephone dialer according to claim 1 wherein said manually actuable mechanically operative means includes a control arm coupled to said control button, said arm being normally at a rest position and movable along a predetermined travel path including said first travel portion and said second travel portion, said second travel portion being contiguous with said first travel portion such that manual operation of only said button provides operational relative movement of said magnetic head and said medium.

5. A telephone dialer comprising:
an elongated magnetic recording tape having a magnetic recording surface and an opposite visual writing surface, said tape being adapted for recording representations of telephone number data on said recording surface and visual representations on said visual writing surface;
a transport mechanism for said magnetic recording tape including a manually operable control knob for causing movement of said tape along the length thereof in either a forward or rearward direction;
a magnetic record/reproduction head disposed in operative association with the magnetic recording surface of said tape;
means defining a travel path generally transverse of said tape along which said magnetic head is movable in alignment with selected transverse positions on said recording surface; and
a manually actuable mechanically operative mechanism coupled to said magnetic head and including a control button, the manual actuation of which causes during a first travel portion of said control button movement of said magnetic head to a start position and during a second travel portion of said control button controlled substantially uniform velocity movement of said magnetic head from said start position to a home position.

6. A telephone dialer according to claim 5 wherein said travel path defining means includes means operative in association with said control button for aligning said magnetic tape at a selected one of said transverse positions on said recording surface for centering the aligned position with respect to said magnetic head during said second travel portion of said control button.

7. A telephone dialer comprising:
an elongated tape having a magnetic recording surface and an opposite writing surface;
a tape transport mechanism supporting said tape for forward and rearward motion along a longitudinal axis thereof and having a manually rotatable control knob for causing longitudinal movement of said tape to selected positions;
a magnetic head assembly including a read/reproduction head disposed adjacent said recording surface and adapted for motion transversely along said recording surface;
means defining a travel path transverse of said tape;
support means coupled to said path defining means for slidable movement thereon and supporting said head in operative association with said recording surface;
an elongated cord affixed to said support means;
biasing means disposed adjacent a home position of said head and coupled to one end of said cord for urging said cord and said head to said home position;
pulley means coupled to the opposite end of said cord and adapted to permit movement of said head transversely of said recording surface in a forward and return direction; and
manually actuable mechanically operative means for causing movement of said head relative to said recording surface in said forward direction to a start position during a first travel portion of a control button and controlled substantially uniform velocity movement of said head in said rearward direction back to said home position during a second travel portion of said control button.

8. A telephone dialer according to claim 7 wherein said pulley means includes:
first and second grooves of different diameters about both of which said cord is wound such that said head is caused to move transversely of said recording surface by a greater amount than the movement of said control button.

9. A telephone dialer according to claim 7 wherein said travel path defining means includes means operative in association with said control button for aligning said magnetic tape at a selected one of a plurality of transverse positions on said recording surface for centering the aligned position with respect to said magnetic head during said second travel portion of said control button.

10. A telephone dialer comprising:
an elongated tape having a magnetic recording surface;
a tape transport mechanism supporting said tape for forward and rearward motion along a longitudinal axis thereof and having a manually rotatable control knob for causing longitudinal movement of said tape to selected positions;
a magnetic head assembly including a read/reproduction head disposed adjacent said recording surface and adapted for motion transversely along said recording surface;
means defining a travel path transverse of said tape;
support means coupled to said path defining means for slidable movement thereon and supporting said head in operative association with said recording surface;
a mechanically operative magnetic head driving assembly coupled to said magnetic head assembly and operative to move said magnetic head along said travel path to a start position against the urging of mechanical bias means and operative at the urging of said bias means to move said magnetic head along said travel path from said start position to a home position at controlled substantially uniform velocity; and
a manually actuable mechanism including a control button for causing during a first travel portion of said control button movement of said head to said start position and during a second travel portion of said control button movement of said head from said start position to said home position.

11. A telephone dialer according to claim 10 wherein said tape transport mechanism includes:
first and second tape spools about which said elongated tape is wound for forward and rearward motion along said longitudinal axis;
bias means in operative association with said tape spools for maintaining tension of said elongated tape extending between said spools; and
a sprocket coupled to at least one of said spools and rotatable therewith, said sprocket being in meshing engagement with corresponding sprocket holes provided along an edge of said elongated tape for driving said tape along said longitudinal axis in response to manual rotation of said control knob.

* * * * *